United States Patent [19]

von Benda et al.

[11] Patent Number: 4,940,553

[45] Date of Patent: Jul. 10, 1990

[54] AQUEOUS NICKEL HYDROXIDE PASTE OF HIGH FLOWABILITY

[75] Inventors: Klaus von Benda, Nurtingen; Gábor Benczùr-Ürmössy, Stuttgart; Gerhard Berger, Deizisau, all of Fed. Rep. of Germany

[73] Assignee: Deutsche Automobilgesellschaft, Fed. Rep. of Germany

[21] Appl. No.: 357,273

[22] Filed: May 26, 1989

[30] Foreign Application Priority Data

May 26, 1988 [DE] Fed. Rep. of Germany ....... 3817826

[51] Int. Cl.$^5$ ............................................. H01M 4/32
[52] U.S. Cl. .............................. 252/182.1; 252/313.1; 429/223
[58] Field of Search ............. 252/182.1, 182.33, 313.1; 429/223

[56] References Cited

U.S. PATENT DOCUMENTS

| | | | |
|---|---|---|---|
| 3,009,979 | 11/1961 | Corren et al. | 429/223 |
| 3,597,829 | 8/1971 | Wagner et al. | 429/223 |
| 3,764,380 | 10/1973 | Grossman | 429/223 |
| 4,074,482 | 2/1978 | Klahr | 350/312 |
| 4,130,696 | 12/1978 | Gunther | 429/223 |
| 4,169,075 | 9/1979 | Kuhling et al. | 252/313.1 |
| 4,217,939 | 8/1980 | Yanagihara et al. | 366/150 |
| 4,218,256 | 8/1980 | Videtto | 106/85 |
| 4,301,218 | 11/1981 | Benczùr-Ürmössy | 429/44 |
| 4,390,447 | 6/1983 | Winsel | 252/182.1 |
| 4,443,526 | 4/1984 | Jackovitz et al. | 252/182.1 |
| 4,481,128 | 11/1984 | Jackovitz et al. | 252/182.1 |
| 4,663,256 | 5/1987 | Corrigan | 429/223 |

OTHER PUBLICATIONS

Hawley, *The Condensed Chemical Dictionary*, 9th Ed., p. 703, Van Nostrand Reinhold Co., (1977), New York, <QD5C5; definition of "Polyphos">.

*Primary Examiner*—Edward A. Miller
*Attorney, Agent, or Firm*—Evenson, Wands, Edwards, Lenahan and McKeown

[57] ABSTRACT

An aqueous nickel-hydroxide paste of high flowability for the vibration filling of foam-structure and fiber-structure electrode plaques has a content of about 30 to 50% by volume of nickel hydroxide, a maximum particle size of about 0.04 mm, a plastic viscosity of about 0.1 to 1 Pa.s and a yield value of between about 10 and 120 Pa, a pH of between about 9 and 12 and a content of about 0.5 to 5, in particular about 1 to 5, % by weight, based on the nickel hydroxide content, of a dispersant from the group comprising the water-soluble salts of polhphosphoric acids or di- and polyphosphonic acids and their derivatives. Very particularly suitable as a dispersant is 1-hydroxyethane-1, 1-diphosphonic acid in the form of its cobalt/alkali salt complex. This paste makes it possible to completely fill foam-structure and fiber-structure electrode plaques in one operation.

11 Claims, No Drawings

AQUEOUS NICKEL HYDROXIDE PASTE OF HIGH FLOWABILITY

BACKGROUND AND SUMMARY OF THE INVENTION

The invention relates to an aqueous nickel hydroxide paste of high flowability for the vibration filling of foam-structure and fiber-structure electrode plaques.

Industrial nickel oxide electrodes (the correct terms are nickel hydroxide electrodes or nickel oxide hydroxide electrodes) can be classified, according to their current collecting structure, as tubular electrodes, pocket plate electrodes, sintered nickel electrodes and fiber plaque electrodes. In button cells, a round electrode of pressed active material without a current collecting structure is used. Plastic bound electrodes have not achieved any relatively great importance. The so called "controlled microgeometry" electrode, in which layers of nickel hydroxide material are held between a multiplicity of perforated nickel foils, have also failed to achieve any dissemination.

In the case of tubular electrodes, the prefabricated nickel hydroxide is ground in powder form, and in the case of the pocket plate electrode, prefabricated compacts, so called briquets, are used. In the case of the narrow-pore sintered nickel plaque, the active nickel hydroxide material is formed in situ in the pores by precipitation from nickel salt solutions by chemical means (using alkalis) or by electrochemical means (cathodic polarization). The chemical precipitation process achieves the necessary concentration of nickel hYdroxide in the pores only by repeating the soaking and precipitation several times with intermediate washing and drying. The electrochemical process achieves the filling in one step, the residence time of the electrode plate in the salt bath being about 1 hour. However, the salt bath alters its composition and has to be discarded from time to time. Both precipitation processes are expensive but are indispensable for powder sintered plaque.

Foam-structure plaque and fiber-structure plaque have been used for about 15 years for supporting the active material. The are composed of metal only or they contain additionally the structure providing plastic or carbon basic body. The impregnation with active material is normally performed using a precipitation process, but descriptions have also been given of mechanical filling processes using prefabricated material which have become possible as a result of the substantially larger pore size compared with powder sintered plaque.

The first mention of vibration filling of foam and fiber plaque with dry pulverulent iron sulphide for lithium/-sulphur cells is found in U.S. Pat. No. 3,933,520. Pulverulent dry nickel hydroxide is not suitable for a fluidized bed process of this type. At values of between 0.4 and 1 g/cm$^3$, the bulk density is too low, the flow properties are unfavorable and the health hazard is high. Attempts have therefore already been made to avoid these disadvantages by using nickel hydroxide suspensions.

The suitability of nickel oxide electrodes is assessed, inter alia, by how much material has been accommodated in the electrode volume. In general, a range of 1.2 to 2.2 g of nickel hydroxide/cm$^3$ of empty volume is regarded as suitable in the literature (for example, G. Crespy, R. Schmitt, M. A. Gutjahr and H. Säufferer in Power Sources 7, page 219 and page 225, Academic Press 1979). However, very high degrees of filling around 2 g/cm$^3$ are not suitable because of the considerable expansion of the electrode. The density of nickel hydroxide (3.94 g/cm$^3$) means that a paste (suspension, slurry) which is intended to achieve the specified range of 1.2 to 2.2 g of nickel hydroxide/cm$^3$ in a single filling operation must have a proportion by volume of nickel hydroxide of at least 30.5%.

In German Published, Unexamined Patent Application (DE-OS) 2,427,421, the proposal was made to allow freshly precipitated nickel hydroxide suspended in a mother liquor to act on a horizontally mounted fiber plaque. The application of vacuum to the lower side of the plaque and the excitation by an ultrasonically driven vibrator electrode in the suspension promote the penetration of the nickel hydroxide into the carrier plaque. The filling is, however, inadequate since an additional soaking with nickel nitrate melt and a chemical preciPitation of further nickel hydroxide by alkali is carried out. This is not surprising since the nickel hydroxide is precipitated in very bulky form with considerable quantities of water of crystallization and anion residues and the necessary density and proportion by volume is far from being achieved in the suspension.

The process described in the U.S. Pat. No. 4,217,939 starts from commercially obtainable nickel hydroxide powder with 10% nickel powder added as a conduction aid. An aqueous paste is formed which has a dry material concentration of 17% by weight for which a proportion by volume of 34.4% by volume of nickel hydroxide can be calculated. A reticulate metal foam plaque is passed horizontally on a perforated plate over the paste container in which the paste is agitated by stirring and is forced upwards into and around the plaque while paste is spread into the plaque from above by doctor blading. Before impregnation, it is necessary to fill the pores of the plaque with water since the paste cannot otherwise be introduced into all the pores. If necessary, additional dry nickel hydroxide is applied to the upper side of the plaque in order to improve the filling result. From this information it is apparent that the transfer of the paste is not achieved with a homogenous working material. The changes in concentration (displacement of the pure water situated in the pores by paste, or additionally applying dry Powder) make it difficult to carry out the process continuously.

In one publication (W. A. Ferrando and W. W. Lee, Proc. of the 31st Power Sources Symposium 1984, page 177), the starting point is also prefabricated nickel hydroxide which is made up with ethylene glycol to form a paste. The specified ratio by mass of 1:3 results, after a conversion to percentages by volume, in a proportion by volume of nickel hydroxide of 8.6%. The paste (heavy cream) is rubbed into a nickel fiber plaque. After drying, the procedure is repeated in order to increase the loading. The necessity for this results from the nickel hydroxide content of the paste. In addition, the use of an organic fluid instead of water is uneconomical, it is necessary to recover the fluid during drying and, in addition, disposal problems may arise for the solvent vapors produced.

In the Japanese published specification No. (Kokai) 81-82,577, a paste composed of nickel hydroxide, cobalt hydroxide, methylcellulose, nickel-plated polyethylene fibers, nickel powder and water is applied to a nickel-plated perforated iron plate and calandered to the desired thickness after drying. The properties of the paste, in particular, the fiber content, make it unsuitable for filling the pores of foam-structure or fiber-structure electrode plaque.

According, the object of the invention is to provide an aqueous nickel hydroxide paste of high flowability for the vibration filling of foam-structure and fiber structure electrode plaque which makes it possible to fill said plaque completely in one operation.

These and other objects are achieved by a paste having a content of nickel hydroxide of about 30% to 50% by volume, a maximum particle size of about 0.04 mm, a plastic viscosity of about 0.1 to 1 Pa.s and a yield value of between about 10 and 120 Pa, and also a pH of between about 9 and 12, and a content of about 0.5% to 5% by weight, based on the nickel hydroxide content, of a dispersant selected from the group consisting of water-soluble salts of polyphosphoric acid, wherein the polyphosphoric acid has about 3 to 20 phosphorus atoms per molecule.

The high content of nickel hydroxide of about 30% to 50% by volume is necessary in order to be able to produce, in one filling step, electrodes which have the concentrations of active material and consequently capacity values per unit volume which have been achievable only with a plurality of steps by the methods hitherto introduced. The particularly preferred range is between about 35% and 45% by volume. Such a high concentration can only be achieved with the aid of specific, very effective dispersants.

Suitable dispersants are the water-soluble salts, in particular the alkali salts, of polyphosphoric acids or of di- and polyphosphonic acids and their derivatives. Particularly suitable are polyphosphates containing about 2 to 20 phosphorus atoms per molecule, and in particular, the polyphosphates containing about 16 to 20 phosphorus atoms in the molecule are preferred. Dispersants from the group comprising di- and polyphosphonic acids and their derivatives should not have more than about two carbon atoms per phosphorus atom per molecule since the conversion of the carbon atoms in the course of the electrode reactions would otherwise produce an intolerably high impurity content. Of this group, 1-hydroxyethane-1, 1-diphosphonic acid (HEDP) or aminotrismethylenephosphonic acid in the form of their alkali salts are particularly suitable.

The sodium and potassium salts of 1-hydroxyethane-1, 1-diphosphonic acid (HEDP) exhibit a stronger liquefying action in nickel hydroxide pastes than the polyphosphates, i.e. for the same viscosity, a paste containing an HEDP salt as dispersant contains more nickel hydroxide, or for the same nickel hydroxide content, a paste containing HEDP salt as dispersant has a lower viscosity. Hereinafter, the tetrabasic acid anion is abbreviated to HEDP and the hydrogen atoms written separately. While the free acid $H_4$ (HEDP) produces very viscous paste, an optimum in the effect is between $NaH_3$ (HEDP) and $Na_2H_2$ (HEDP) The pH of the paste is about 10 or 11.2 and is consequently within the claimed range or between about 9 and 12. The pH of the paste containing $Na_3H$ (HEDP) is already about 12.1. At this value, the absorption of $CO_2$ from the air reaches a level which jeopardizes the use of the filled electrode in storage cells.

A surprising further increase in the nickel hydroxide concentration or reduction in the viscosity (reduction in the yield value or the plastic viscosity) is achieved by using an alkali-metal/cobalt complex of 1-hydroxyethane-1, 1-diphosphonic acid. Within the general formula $Co_xK_yH_z$(HEDP), with $2x+y+z=4$, the following ranges are permissible: $x=$about 0.5 to 1.25, $y=$about 0.5 to 1.5 and $z=$about 0.2 to 2. Outside these ranges, the pH is already too high and the yield value increases. The fluid can be produced by dissolving cobalt hydroxide in a suitable quantity in aqueous 1-hydroxyethane-1, 1-diphosphonic acid and adding a suitable quantity of alkali hydroxide.

The dispersant is used in quantities of about 0.5% to 5% by weight, based on nickel hydroxide, in particular in quantities of about 1% to 5% by weight. A higher addition only increases the number of foreign ions later present in the electrolyte without, however, achieving an improved effect. Below about 0.5% by weight, the effect of the dispersant is in some cases already too low and the viscosity of the paste is therefore too high.

In order to be able to penetrate the pores of the foam-structure or fiber-structure plaque, the paste must have an adequate flowability.

Other objects, advantages and novel features of the present invention will become apparent from the following detailed description of the invention when considered in conjunction with the accompanying drawings.

DETAILED DESCRIPTIONS OF PREFERRED EMBODIMENTS OF THE PRESENT INVENTION

From a rheological point of view, the nickel hydroxide paste according to preferred embodiments of the present invention belongs to the plastic bodies. Usually an ideal plastic behavior is found (so called Bingham bodies). The viscosity is not a material constant and it can be represented only in a flow diagram (shear stress in Pa against velocity gradient in $s^{-1}$). Below a certain shear stress, the paste is solid, it having a yield value. In the case of ideal plastic behavior, there is linearity between shear stress and velocity gradient after exceeding the yield value. The plastic viscosity is the quotient of the shear stress less the yield value and the velocity gradient. The yield value and the plastic viscosity describe the system completely.

For an explanation of the rheological terms and measuring methods, reference may be made to the Contraves Company publication entitled "Messung rheologischer Eigenschaften" ("Measurement of rheological properties:) (Bulletin T 990 d-7309), Section 6.3 (Plastic flow behavior) and also the publication by A. Fincke and W. Heinz entitled "Zur Bestimmung der Fliessgrenze grobdisperser Systeme" ("On the determination of the yield value of coarsely dispersed systems"), Rheologica Acta, 1 (1961), 530. The measurements were carried out with the rotation viscometer Rotovisco RV 12 manufactured by Haake using the measuring devices NV and MV I. Shear rates (velocity gradients) of at least about 100 $s^{-1}$ should be achieved. For the purpose of evaluation, use was made of the relaxation curve. The measurements were carried out at 20 C.

The paste is suitable for filling the pores if the yield value is between about 10 and 120 Pa and the plastic viscosity is about 0.1 to 1 Pa.s, the preferred range being between about 0.15 and 0.25 Pa.s. The paste should preferably have a slight thixotropy (time dependence of the viscosity). After the filling operation, the paste should still remain liquid for a time in order to facilitate the removal of excess paste from the surface of the filled body. However, it should not be so liquid that it is able to escape from the pores again and form troublesome drainage drops.

The maximum particle size of the paste must be markedly below the mean pore size of the substrate to be filled in order to avoid blockages. The maximum particle size is about 0.04 mm and the preferred range is between about 0.015 and 0.03 mm. To determine the particle size, use is made of a so called grindometer in which a paste coating with decreasing thickness is assessed. The maintenance of the pH between about 9 and 12, in particular between about 10 and 12, is also important for the viscosity of the paste and the behavior during filling. If the pH is too high, such a strong carbonation already occurs in the paste that the finished electrodes are subsequently unusable.

The beneficial effect of a cobalt doping on the nickel oxide electrode is known. The paste is doped with additives of cobalt powder or with cobalt compounds in the form of the oxides, hydroxides, borates, phosphates and the like. Because of the high density and the good effectiveness, cobalt powder is particularly preferred. The total quantity of cobalt is about 2 to 12 atom percent, based on nickel. The use of the alkali-metal/cobalt complex of HEDP not only achieves, as already described, a surprising further rise in the nickel hydroxide concentration, but some of the cobalt required for the doping can also very advantageously be introduced into the paste. The cobalt introduced via the cobalt complex has a very particularly uniform distribution and is therefore very particularly effective in the electrode.

The paste is best produced in a ball mill using grinding balls of ceramic material. If the paste is to be doped with metallic cobalt, the mill must be hermetically sealed owing to the sensitivity of cobalt to oxidation in alkaline medium. The optimum grinding time for producing the paste depends, inter alia, on the paste mix, on the degree of filling of the mill, on the grinding balls and on the rotary speed, but can be determined in an easy manner per se. In general the grinding time is up to about 24 hours. Usually, the mixture passes through a phase at the beginning with a thin-bodied consistency. Sometimes, dilatant behavior, which disappears with the grinding time, is also observed. The paste is ready if the specified viscosity data and the grindometer value are in the claimed range.

EXAMPLE 1

About 405 g (about 36.7% by volume) of pulverulent nickel hydroxide (manufactured by Riedel-de-Haën), about 12.5 g (190 % by volume) of cobalt powder and about 182 g (about 176 ml, about 62.8% by volume) of an about 5% aqueous sodium polyphosphate solution containing about 17 phosphorus atoms in the polyphosphate ion (Calgon 322 manufactured by Benckiser-Knapsack) were ground for about 16 hours in about a 1L porcelain ball mill with the aid of about 540 g of grinding balls composed of aluminium oxide ceramic and having a diameter of about 16 mm at a rotary speed of about 70/min. The following rheological data were determined from the flow curve of the paste by extrapolation and regression calculation. (Measuring apparatus: Viscometer RV 12 manufactured by Haake, measuring device MV I, maximum velocity gradient equals about 300 s$^{-1}$, T=about 20 C.: yield value =about 105 Pa, plastic viscosity=about 0.30 Pa.s. The maximum particle diameter determined with the grindometer was about 23 μm.

EXAMPLE 2 value=

Instead of sodium polyphosphate solution, an about 5% by weight aqueous solution of the disodium salt of 1-hydroxyethane-1, 1-diphosphonic acid, $Na_2H_2$(HEDP), was used as fluid. The mixture in the ball mill had the same composition as in Example 1. The grinding conditions were also unaltered. The viscosity data obtained for the finished paste were markedly lower: yield value =about 63 Pa, plastic viscosity=about 0.12 Pa.s. The pH of the paste was about 11.2 and the maximum particle size was about 18 μm.

EXAMPLE 3

On about 0.2 molar solution of the composition $CoK_{1.5}H_{0.5}$(HEDP) was used as dispersive solution. To produce a liter of this solution, about 68.7 g of about 60% aqueous HEDP acid (Turpinal SL, manufactured by Henkel) were weighed out into a beaker and approximately about 800 ml of deionised water was added. About 18.6 g of cobalt hydroxide were dissolved in it while stirring. About 35 g (about 23.7 ml) of about 47% KOH were then added while stirring, which increased the pH of the solution to about 6. The solution was transferred to a volumetric flask and made up to about 1 liter with water.

To produce the paste, about 500 g (about 40% by volume) of nickel hydroxide, about 15.5 g (about 0.55% by volume) of cobalt powder and about 195.3 g (about 188.5 ml) (about 59.45% by volume) of fluid were rolled together with about 650 g of grinding balls in a 1 liter porcelain ball mill for about 20 hours at about 70 rev/min. Despite the increased concentration of nickel hydroxide, a paste of lower viscosity resulted which had the yield value of about 18 Pa and the plastic viscosity of about 0.21 Pa.s. The grindometer value was about 20 μm. The pH was about 11.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Aqueous Ni(OH)$_2$ paste of high flowability for the vibration filling of foam-structure and fiber-structure electrode plaques having a content of nickel hydroxide of about 30 to 50% by volume, a maximum particle size of about 0.04 mm, a plastic viscosity of about 0.1 to 1 Pa.s and a yield value of between about 10 and 120 Pa, and also a pH of between about 9 and 12, which, in addition, also contains a dispersant, wherein the dispersant is selected from one of the group consisting of water-soluble salts of derivatives of di- and polyphosphonic acids and the group consisting of water-soluble salts of polyphosphoric acid, wherein the polyphosphoric acid has about 3 to 20 phosphorus atoms per molecule.

2. Aqueous Ni(OH)$_2$ paste according to claim 1, wherein the polyphosphoric acid has about 6 to 20 phosphorus atoms per molecule.

3. Aqueous Ni(OH)$_2$ paste according to claim 1, wherein a content of about 0.5 to 5% by weight, based on the nickel hydroxide content, of the dispersant selected from the group consisting of water-soluble salts of polyphosphoric acid is provided.

4. Aqueous Ni(OH)$_2$ paste according to claim 1, wherein the dispersant selected from the group consisting of water-soluble salts of derivatives of di- and polyphosphonic acids are alkylated or arylated phosphonic acids.

5. Aqueous $Ni(OH)_2$ paste according to claim 4, wherein the dispersant selected from the group consisting of water-soluble salts of derivatives of di- and polyphosphonic acids do not contain more than two C atoms per P atom in the molecule.

6. Aqueous $Ni(OH)_2$ paste according to claim 1, wherein the dispersant selected from the group consisting of the water-soluble salts of polyphosphoric acids are alkali salts.

7. Aqueous $Ni(OH)_2$ paste according to claim 1, wherein the dispersant selected from the group consisting of derivatives of di- and polyphosphonic acids are alkali salts.

8. Aqueous $Ni(OH)_2$ paste according to claim 1, wherein the dispersant is selected from the group of 1-hydroxyethane-1, 1-diphosphonic acid and aminotris-methylenephosphonic acid.

9. Aqueous $Ni(OH)_2$ paste according to claim 1, wherein the dispersant is an alkali-metal/cobalt complex of 1-hydroxyethane-1, 1-disphosphonic acid (HEDP) of the formula $Co_xM_yH_z(HEDP)$, in which M denotes an alkali metal and x is between about 0.5 and 1.25, y is between about 0.5 and 1.5 and z is between about 0.2 and 2, with the proviso that $2x+y+z=4$.

10. Aqueous $Ni(OH)_2$ paste according to claim 1, further including at least one of a cobalt powder and cobalt compounds selected from the group consisting of oxides, hydroxides, borates and phosphates.

11. Aqueous $Ni(OH)_2$ paste according to claim 10, wherein total cobalt content in the paste is about 2 to 12 atom percent, based on nickel.

* * * * *